US006847366B2

(12) United States Patent
Walls et al.

(10) Patent No.: US 6,847,366 B2
(45) Date of Patent: Jan. 25, 2005

(54) SYSTEM AND METHOD UTILIZING MULTIPLE PROCESSES TO RENDER GRAPHICAL DATA

(75) Inventors: Jeffrey Joel Walls, Fort Collins, CO (US); Donley Byron Hoffman, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 231 days.

(21) Appl. No.: 10/087,472

(22) Filed: Mar. 1, 2002

(65) Prior Publication Data

US 2003/0164831 A1 Sep. 4, 2003

(51) Int. Cl.[7] .............................................. G06F 15/80
(52) U.S. Cl. ...................... 345/505; 345/506; 345/522
(58) Field of Search ................................ 345/505, 506, 345/522, 502, 558, 520, 501; 709/100, 102, 107, 203

(56) References Cited

U.S. PATENT DOCUMENTS

| | | | |
|---|---|---|---|
| 5,321,808 A | 6/1994 | Rupp ........................ 395/164 |
| 5,394,524 A | 2/1995 | DiNicola et al. | |
| 5,408,602 A | 4/1995 | Giokas ....................... 395/157 |
| 5,473,750 A | * 12/1995 | Hattori ....................... 345/505 |
| 5,757,321 A | 5/1998 | Billyard ...................... 345/434 |
| 5,818,469 A | * 10/1998 | Lawless et al. ............. 345/522 |
| 5,844,553 A | 12/1998 | Hao et al. ................... 345/329 |
| 6,005,572 A | 12/1999 | Kurihara .................... 345/340 |
| 6,215,486 B1 | 4/2001 | Walls et al. ................ 345/329 |
| 6,222,550 B1 | 4/2001 | Rosman et al. ............. 345/419 |
| 6,249,294 B1 | 6/2001 | Lefebvre et al. ............ 345/504 |
| 6,308,237 B1 | * 10/2001 | Strongin et al. ............ 345/520 |
| 6,323,867 B1 | * 11/2001 | Nookala et al. ............ 345/522 |
| 6,343,309 B1 | * 1/2002 | Clarke et al. ............... 345/418 |
| 6,515,670 B1 | * 2/2003 | Huang et al. ............... 345/503 |

OTHER PUBLICATIONS

"Understanding X Features: Distributed Single Logical Screen" http://www.hp.com/xwindow/sharedInfo/Whitepapers/Slsd/slsd.html, 1998, pp. 1–10.

Lefebvre, Kevin "Hewlett–Packard's Large Screen Multi–Display Technology: An Exploration of the Architecture Behind HP's New Immersive Visualization Solutions" http://wwww.hp.com;xwindow/sharedInfo/Whitepapers/Sls3d/sls_3d.html; 1998, pp. 1–9.

"Understanding X Features: Multiple Display Technologies" http://www.hp.com/xwindow/sharedInfo/Whitepapers/Sls/sls.html, 1997, pp. 1–13.

* cited by examiner

Primary Examiner—Kee M. Tung

(57) ABSTRACT

A system for rendering graphical data utilizes a plurality of graphics pipelines, a first process, and a second process. Each of the plurality of graphics pipelines is configured to render graphical data. The first process is configured to receive three-dimensional (3D) graphics commands from a graphics application and to receive input commands from a user input device. The first process is configured to buffer the received 3D graphics commands and to execute the received input commands, and the first process, for each of the buffered 3D graphics commands, is configured to begin processing a newly received command upon buffering the 3D graphics command. The second process is configured to interface the buffered graphics commands with each of the plurality of pipelines, wherein execution of the user input command affects an object defined by the graphics application.

28 Claims, 12 Drawing Sheets

SYSTEM AND METHOD UTILIZING MULTIPLE PROCESSES TO RENDER GRAPHICAL DATA

BACKGROUND OF THE INVENTION

1. Field of the Invention

The present invention generally relates to graphical display systems and, in particular, to a system and method utilizing multiple processes to render graphical data.

2. Related Art

Computer graphical display systems are commonly used for displaying graphical representations of two-dimensional and/or three-dimensional objects on a two-dimensional display device, such as a cathode ray tube, for example. In this regard, a computer graphical display system normally includes one or more graphics applications having graphical data that defines one or more graphical objects. When a graphical object is to be displayed, the graphics application submits a command or a set of commands, referred to hereafter as a "drawing command," for drawing the object. The drawing command includes or is associated with graphical data that defines the color value and possibly other attributes for each pixel of the object.

In response to the drawing command, a graphics pipeline within the graphical display system renders the command's graphical data to a frame buffer. The data within the frame buffer defines the display attributes (e.g., color) for each pixel of a display device, which display device periodically reads the frame buffer and colors each pixel displayed by the display device according to each pixel's corresponding color value in the frame buffer. Moreover, by rendering the graphical data of the drawing command to the frame buffer, the image displayed by the output device is eventually updated to include an image of the object defined by the graphical data of the drawing command.

Higher quality images are often defined by larger amounts of graphical data. However, in general, increasing the amount of graphical data defining an image to be displayed undesirably increases the amount time required for a graphical display system to render the graphical data. Indeed, when a graphical display system is processing time-consuming graphics commands, other functions performed by the graphical display system, such as receiving user input, can be significantly delayed.

SUMMARY OF THE INVENTION

Generally, the present invention provides a graphical rendering system and method that utilize multiple processes for rendering graphical data.

A graphical rendering system in accordance with an exemplary embodiment of the present invention utilizes a plurality of graphics pipelines, a first process, and a second process. Each of the plurality of graphics pipelines is configured to render graphical data. The first process is configured to receive three-dimensional (3D) graphics commands from a graphics application and to receive input commands from a user input device. The first process is configured to buffer the received 3D graphics commands and to execute the received input commands, and the first process, for each of the buffered 3D graphics commands, is configured to begin processing a newly received command upon buffering the 3D graphics command. The second process is configured to interface the buffered graphics commands with each of the plurality of pipelines, wherein execution of the user input command affects an object defined by the graphics application.

A method in accordance with an exemplary embodiment of the present invention can be broadly conceptualized by the following steps: simultaneously running a first process and a second process, rendering graphical data in parallel via a plurality of graphics pipelines, receiving user input commands and graphics commands, analyzing the received commands, identifying three-dimensional (3D) graphics commands, via the first process, based on the analyzing step, queuing each of the identified 3D graphics commands in a command queue, via the first process, interfacing the queued commands, via the second process, with the plurality of graphics pipelines, and executing the user input commands, via the first process.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION OF THE INVENTION

Figure 1:
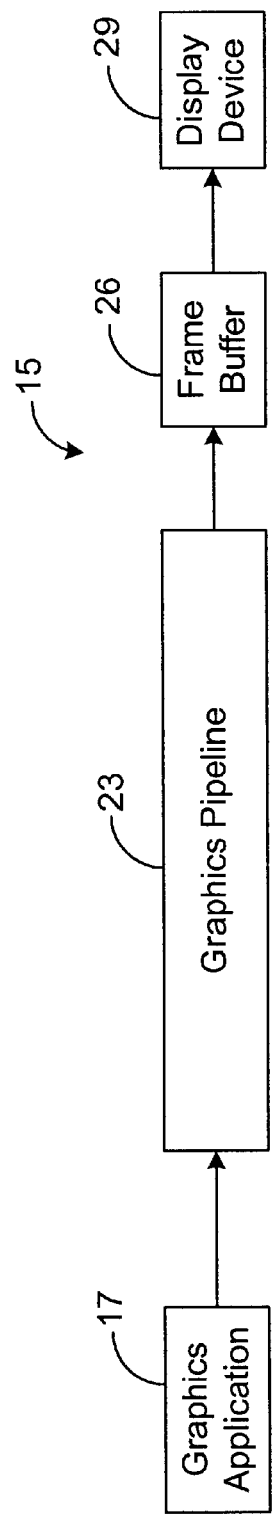
FIG. 1 is a block diagram illustrating a conventional graphical display system.

FIG. 1 depicts an exemplary embodiment of a conventional computer graphical display system 15. A graphics application 17 defines, in data, various objects that may be rendered and displayed by the system 15. To display an object, the application 17 transmits a graphics command having graphical data that defines the object to a graphics pipeline 23, which may be implemented in hardware, software, or a combination thereof. The graphics pipeline 23 receives the graphical data from the application 17 and, through well-known techniques, renders or accelerates the graphical data to a frame buffer 26.

In general, the frame buffer 26 stores graphical data defining an image that is to be displayed by a display device 29. In this regard, the frame buffer 26 includes a set of data for each pixel displayed by the display device 29. Each set of data is correlated with the coordinate values that identify one of the pixels displayed by the display device 29, and each set of data includes the color value of the identified pixel, as well as any additional information needed to appropriately color or shade the identified pixel.

Figure 2:
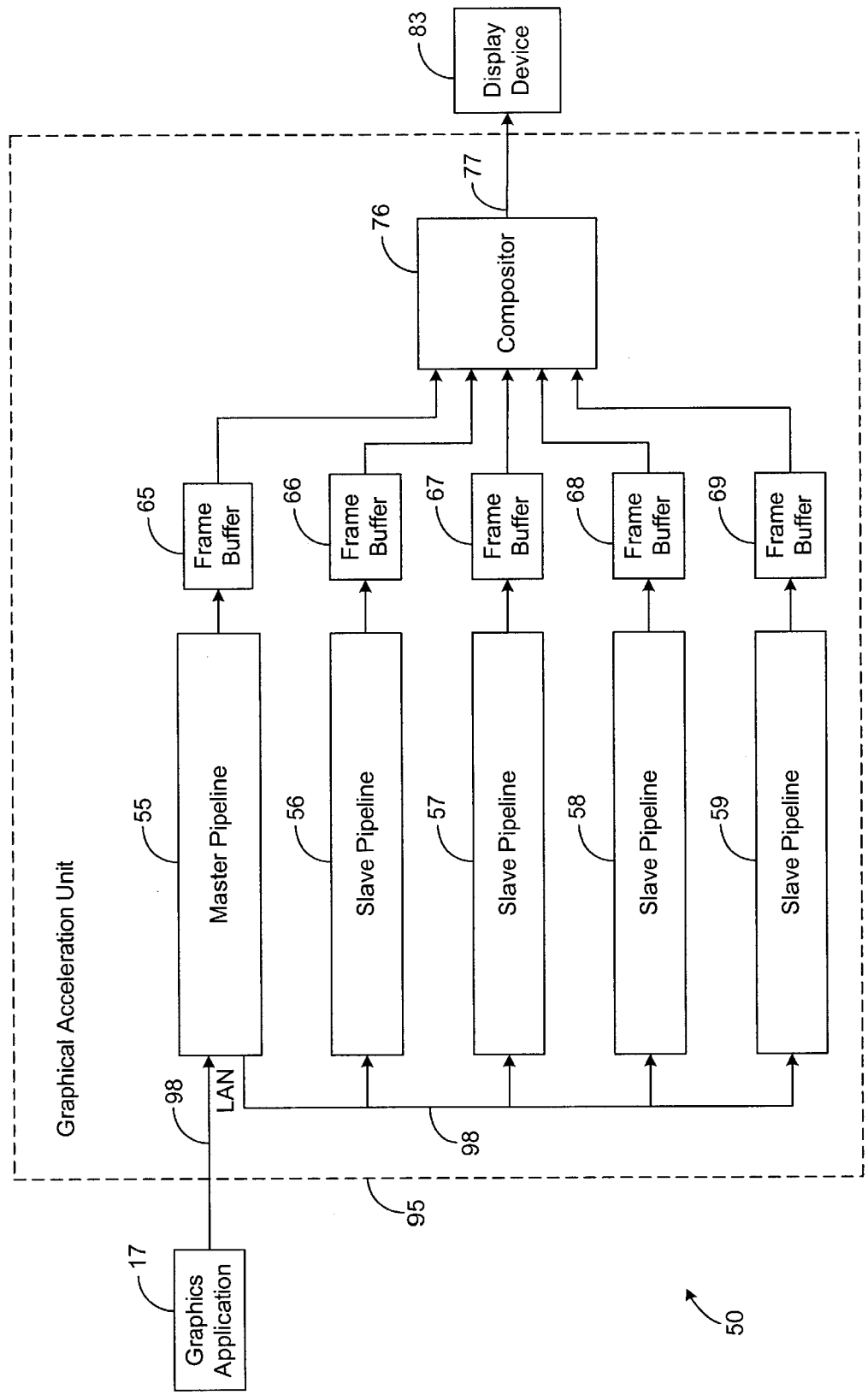
FIG. 2 is a block diagram illustrating a graphical display system in accordance with an exemplary embodiment of the present invention.

By employing a plurality of graphics pipelines, it is possible to increase rendering speed and/or image quality. For example, FIG. 2 depicts an exemplary embodiment of a computer graphical display system 50 having multiple pipelines 55–59. As shown by FIG. 2, the system 50 includes a graphics application 17, a master graphics pipeline 55, and one or more slave graphics pipelines 56–59. The pipelines 55–59 may be implemented via hardware, software or any combination thereof. It should be noted that the embodiment shown by FIG. 2 depicts four slave pipelines 56–59 for illustrative purposes only, and any number of slave pipelines 56–59 may be employed to implement the system 50 in other embodiments.

The master pipeline 55 receives graphics commands from the application 17. The master pipeline 55 preferably renders the graphical data from two-dimensional (2D) graphics commands to the frame buffer 65 and passes three-dimensional (3D) graphics commands to the slave pipelines 56–59, which render the graphical data of the 3D graphics commands to the frame buffers 66–69, respectively. As used herein, a "2D graphics command" refers to a graphics command that includes 2D graphical data but no 3D graphical data, and a "3D graphics command" refers to a graphics command that includes 3D graphical data. Note that a 3D graphics command may also include 2D graphical data.

Also note that other arrangements of the pipelines 55–59 are possible in other embodiments. More specifically, the master pipeline 55 may be configured to render graphical data from 3D graphics commands in addition to or in lieu of graphical data from 2D graphics commands, and one or more of the slave pipelines 56–59 may be configured to render graphical data from 2D graphics commands instead of or in addition to graphical data from 3D graphics commands.

Each frame buffer 65–69 may output a stream of graphical data to a compositor 76, which may be implemented in software, hardware, or a combination thereof. The compositor 76 is configured to provide, to a display device 83 (e.g., a cathode ray tube), a composite data signal 77 based on each of the data streams from the frame buffers 65–69. The graphical data provided to the display device 83 by the compositor 76 defines an image to be displayed by the display device 83 and is based on the graphical data rendered by the pipelines 55–59 to the frame buffers 65–69. The compositor 76 will be further described in more detail hereafter. Note that the pipelines 55–59, the frame buffers 65–69, and the compositor 76 will be collectively referred to herein as a graphical acceleration unit 95.

In some situations, it may be desirable to distribute some of the graphics pipelines 55–59 across multiple computers.

In this regard, by distributing the graphics pipelines 55–59 across multiple computers, it is possible to divide the processing burden associated with the rendering performed by the pipelines 55–59 across the multiple computers rather than having a single computer bear the entire processing burden alone. For illustrative purposes, assume that each of the graphics pipelines 55–59 is implemented via a different computer. However, it should be noted that, in other embodiments, multiple ones of the graphics pipelines 55–59 could be implemented via the same computer, if desired.

When the graphics pipelines 55–59 are implemented via different computers, it may be desirable to utilize a network, such as a local area network (LAN), for example, to enable communication between the pipelines 55–59. Indeed, in the exemplary embodiment shown by FIG. 2, a LAN 98 is utilized to interconnect each of the pipelines 55–59, which preferably reside on different computers as described above.

Figure 3:
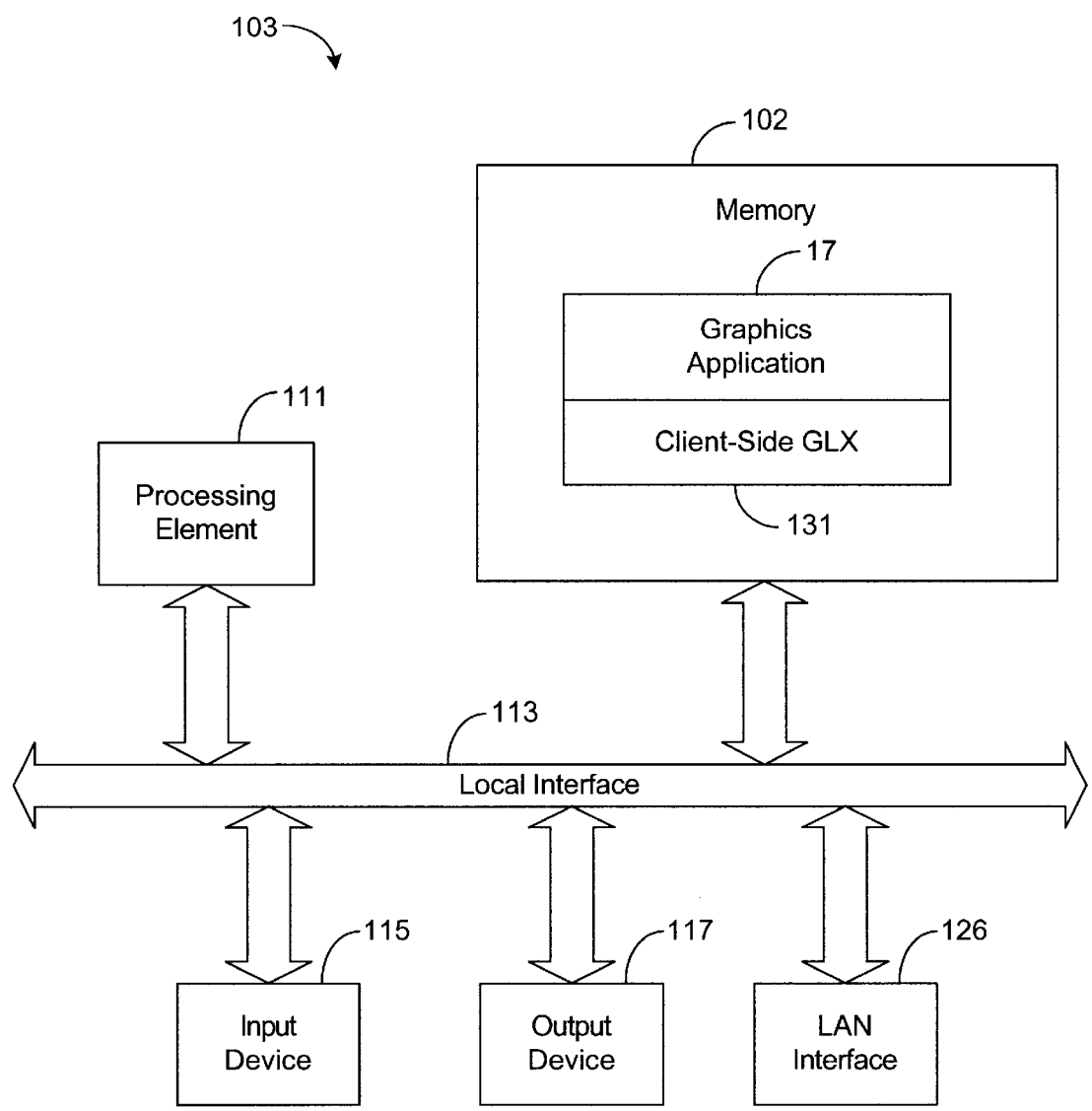
FIG. 3 is a block diagram illustrating a computer that may be utilized to implement a graphics application such as is depicted in FIG. 2.

FIG. 3 depicts a block diagram of a computer 103, referred to hereafter as "client computer," that may be utilized to run the graphics application 17. As can be seen by referring to FIG. 3, the client computer 103 preferably stores the graphics application 17 in memory 102. Through conventional techniques, the application 17 is executed via one or more conventional processing elements 111, such as a central processing unit (CPU), for example, which communicate to and drive the other elements within the client computer 103 via a local interface 113, which can include one or more buses. Furthermore, an input device 115, for example, a keyboard or a mouse, can be used to input data from a user of the client computer 103, and an output device 117, for example, a display device or a printer, can be used to output data to the user. The client computer 103 preferably includes a LAN interface 126 that allows the client computer103 to exchange data with the LAN 98.

Various types of network protocols may be employed to process the graphical data received from the graphics application 17. In the exemplary embodiment of the system 50 described herein, X Protocol is preferably utilized to render 2D graphical data, and an extension of X Protocol, referred to as "OpenGL (OGL) Protocol," is preferably utilized to render 3D graphical data, although other types of protocols may be utilized in other embodiments.

By way of background, OGL Protocol is a standard application programming interface (API) to hardware that accelerates 3D graphics operations. Although OGL Protocol is designed to be window system independent, it is often used with window systems, such as the X Window System, for example. In order that OGL Protocol may be used in an X Window System environment, an extension of the X Window System has been developed called "GLX." For more complete information on the GLX extension to the X Window System and on how OGL Protocol can be integrated with the X Window System, see for example Mark J. Kilgard, *OpenGL Programming for the X Window System* (Addison-Wesley Developers Press 1996), which is incorporated herein by reference. Also see commonly-assigned U.S. Pat. No. 6,249,294, entitled "3D Graphics in a Single Logical Screen Display Using Multiple Remote Computer Systems," which is incorporated herein by reference as well.

The client computer 103 preferably includes a client-side GLX layer 131 that can be implemented in software, hardware, or a combination thereof. In the embodiment shown by FIG. 3, the client-side GLX layer 131 is implemented in software and translates each graphics command issued by the graphics application 17 into one or more X Protocol commands for performing the functionality commanded by the issued command. In the preferred embodiment, the X Protocol commands are communicated to the master pipeline 55 via LAN interface 126 and LAN 98.

Figure 4:
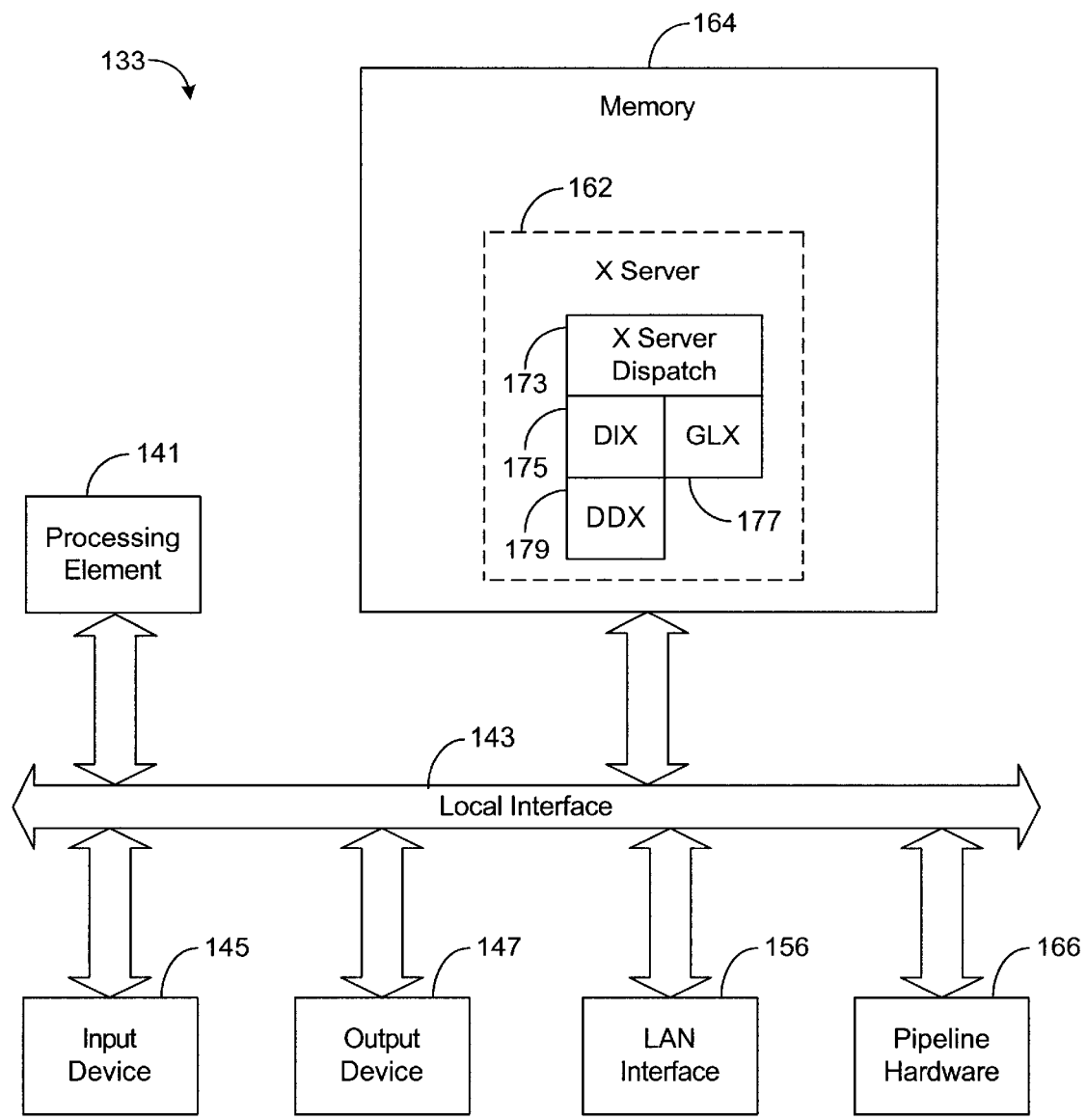
FIG. 4 is a block diagram illustrating a computer that may be utilized to implement a master graphics pipeline such as is depicted in FIG. 2.

FIG. 4 depicts a block diagram of a computer 133 that may be utilized to implement the master pipeline 55 in the preferred embodiment. As shown by FIG. 4, the computer 133 preferably includes one or more processing elements 141, such as a central processing unit, for example, that communicate to and drive the other elements within the computer 133 via a local interface 143, which can include one or more buses. Furthermore, an input device 145, for example, a keyboard or a mouse, can be used to input data from a user of the computer 133, and an output device 147, for example, a display device or a printer, can be used to output data to the user. The computer 133 may be connected to a LAN interface 156 that allows the computer 133 to exchange data with the LAN 98.

The computer 133 also includes an X server 162. The X server 162 may be implemented in software, hardware, or a combination thereof, and in the embodiment shown by FIG. 4, the X server 162 is implemented in software and stored in memory 164. The X server 162 preferably renders 2D X Protocol commands, such as commands to create or move an X window. In this regard, an X server dispatch layer 173 is designed to route received commands to a device independent (DIX) layer 175 or to a GLX layer 177. A 2D X Protocol command (i.e., an X Protocol command that does not include 3D graphical data) is interfaced with the DIX layer 175, whereas a 3D X Protocol command (i.e., an X Protocol command that includes 3D graphical data, such as an X Protocol command having embedded OGL Protocol) is interfaced with the GLX layer 177. An example of a 3D X Protocol command is an X Protocol command that creates or changes the state of a 3D image within a 2D X window.

Moreover, a command interfaced with the DIX layer 175 is executed by the DIX layer 175 and by a device dependent (DDX) layer 179, which drives graphical data associated with the executed command through pipeline hardware 166 to the frame buffer 65. A command interfaced with the GLX layer 177 is transmitted by the GLX layer 177 across the LAN 98 to the slave pipelines 56–59. After receiving the command, one or more of the pipelines 56–59 execute the command and render the graphical data associated with the command to one or more frame buffers 66–69. Note that logic for implementing the master pipeline 55 shown by FIG. 2 generally resides within the X server 162 and the pipeline hardware 166 of FIG. 4.

Although the graphics application 17 and the master pipeline 55 are implemented via different computers 103 and 133 in the embodiment described above, it is possible for the graphics application 17 and the master pipeline 55 to be implemented via the same computer in other embodiments. For example, it is possible to store the graphics application 17 and the client-side GLX layer 131 in the memory 164 of the computer 133 shown by FIG. 4.

Figure 5:
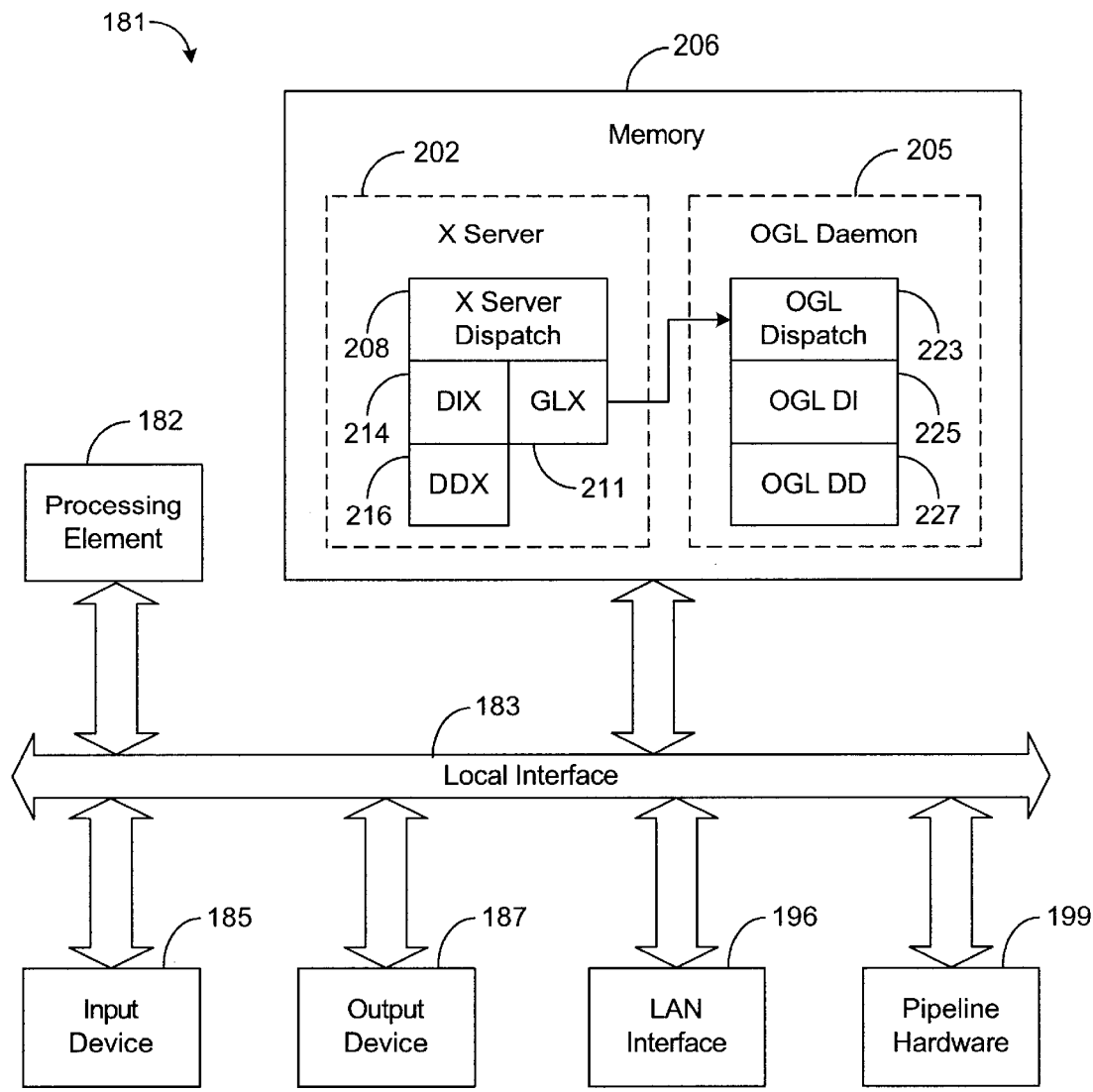
FIG. 5 is a block diagram illustrating a computer that may be utilized to implement a slave graphics pipeline such as is depicted in FIG. 2.

FIG. 5 depicts a block diagram of a computer 181 that may be utilized to implement any one of the slave pipelines 56–59. The computer 181, shown by FIG. 5, preferably comprises an X server 202, similar to the X server 162 previously described for computer 133, and an OGL daemon 205. The X server 202 and OGL daemon 205 may be implemented in software, hardware, or a combination thereof, and in the embodiment shown by FIG. 5, the X server 202 and OGL daemon 205 are implemented in software and stored in memory 206.

Similar to computers 103 and 133 (FIGS. 3 and 4), the computer 181 of FIG. 5 comprises one or more processing elements 182 that communicate to and drive the other elements within the computer 181 via a local interface 183, which can include one or more buses. Furthermore, an input device 185, for example, a keyboard or a mouse, can be used to input data from a user of the computer 181, and an output device 187, for example, a display device or a printer, can be used to output data to the user. The computer 181 preferably includes a LAN interface 196 that allows the computer 181 to exchange data with the LAN 98.

Similar to X server 162 (FIG. 4), the X server 202 of FIG. 5 comprises an X server dispatch layer 208, a GLX layer 211, a DIX layer 214, and a DDX layer 216. In the embodiment described above, each command received by the computer 181 includes 3D graphical data, because the X server 162 of master pipeline 55 preferably executes each 2D X Protocol command. The X server dispatch layer 208 interfaces the 2D data of any received commands with DIX layer 214 and interfaces the 3D data of any received commands with the GLX layer 211. The DIX and DDX layers 214 and 216 are configured to process or accelerate the 2D data and to drive the 2D data through pipeline hardware 199 to one of the frame buffers 66–69 (FIG. 2).

The GLX layer 211 interfaces the 3D data with the OGL dispatch layer 223 of the OGL daemon 205. The OGL dispatch layer 223 interfaces this data with the OGL DI layer 225. The OGL DI layer 225 and DD layer 227 are configured to process the 3D data and to accelerate or drive the 3D data through pipeline hardware 199 to one of the frame buffers 66–69 (FIG. 3). Thus, the 2D graphical data of a received command is processed or accelerated by the X server 202, and the 3D graphical data of the received command is processed or accelerated by the OGL daemon 205. Note that logic for implementing a slave pipeline 56–59 (FIG. 2) generally resides within the X server 202, pipeline hardware 199, and OGL Daemon 205. Furthermore, for a more detailed description of the foregoing process of accelerating 2D data via an X server 202 and of accelerating 3D data via an OGL daemon 205, refer to U.S. Pat. No. 6,249,294.

As set forth above, the compositor 76 (FIG. 2) is configured to form a composite data signal 77 that is based on the graphical data stored in one or more of the frame buffers 65–69. The composite data signal 77 defines the color values for the pixels of the display device 83, and the display device 83 updates its displayed image based on the color values received from the composite data signal 77. Various techniques may be employed by the compositor 76 in forming the composite data signal 77 such that the performance of the system 50 and/or the quality of the images displayed by the system 50 are improved. For example, the compositor 76 may help to optimize performance of the system 50 by utilizing data from different ones of the frame buffers 65–69 in defining different portions of the image displayed by the system 50. In addition, the compositor 76 may improve image quality by utilizing the data stored in multiple ones of the frame buffers 65–69 to perform jitter enhancement, anti-aliasing, and/or other image enhancement techniques. A more detailed description of an exemplary compositor that may be employed in the system 50 is included in commonly-assigned U.S. patent application Ser. No. 09/715,335, entitled "System and Method for Efficiently Rendering Graphical Data," which is incorporated herein by reference.

Furthermore, it should be noted that the compositor 76 may be removed from the system 50, if desired. In such and embodiment, each of the pipelines 55–59 may be configured to render graphical data to a different display device 83.

Such an embodiment is generally referred to as single logical screen (SLS) and is described in more detail in commonly-assigned U.S. Pat. No. 6,249,294.

During operation, a user of the system 50 may submit input commands via one or more input devices included in the system 50. As an example, the user may submit such commands via the input device 115 of the client computer 103 (FIG. 3). Alternatively, the user may submit such input commands via the input device 145 of the computer 133 (FIG. 4) implementing the master pipeline 55 or via the input device 185 of a computer 181 (FIG. 5) implementing one of the slave pipelines 56–59. As described previously, such input devices 115, 145, and 185 may include various components, such as a keyboard or mouse, for enabling a user to submit inputs.

The input commands submitted by the user may perform a variety of functions. As, an example, an input command, when executed, may move or resize an object (e.g., a window) being displayed by the system 50. One type of object commonly controlled via the submission of user inputs is a graphical pointer (e.g., an arrow) that allows the user to select various displayed icons or other types of objects. To select a particular object, the user submits (via movement of a mouse, for example) input commands for moving the graphical pointer over the particular object and then submits a command (via activation of the mouse, for example) for selecting the object over which the graphical pointer is displayed. Such a methodology for selecting an object is generally well-known in the art and is implemented in most conventional window-based computer systems.

Each input command submitted by the user is preferably passed to the master pipeline 55 and executed by the master pipeline 55. As an example, if the user utilized the client computer 103 (FIG. 3) to submit an input command, the input command is preferably received by the input device 115 and transmitted over the LAN 98 via LAN interface 126. Note that the input commands from the input device 115 and the graphics commands from the graphics application 17 may be interleaved when transmitted to the master pipeline 55.

Most input commands generally do not include 3D graphical data and are, therefore, 2D commands that may be executed by the X server 162 of the master pipeline 55. Thus, according to the techniques described herein, the X server 162 preferably executes the input commands submitted by the user of the system 50 and renders graphical data based on the executed input commands to the frame buffer 65.

In some cases, the master pipeline 55 may receive, from the graphics application 17, a 3D graphics command that takes a significant amount of time for the master pipeline 55 to process. For example, a particular 3D graphics command may include a relatively large amount of graphical data. Due to the amount of graphical data included in the command, it may take a relatively long time for the master pipeline 55 to pass the command to the slave pipelines 56–59, particularly when communication with the slave pipelines 56–59 occurs over the LAN 98. As a result, processing of the 3D graphics command by the master pipeline 55 may delay other commands received by the master pipeline 55.

In another situation, the 3D graphics command may require a reply to be communicated to the graphic application 17. For example, according to X protocol, a graphics command for drawing a new object requires the application 17 to be informed when the new object has been created. Such notice includes an identifier for identifying the object, and the graphics application 17 utilizes this identifier in submitting future commands to modify or change the object. Note that various other types of commands may similarly require notices or replies to be provided to the graphics application 17.

Furthermore, according to X Protocol, when a graphics application submits a command that requires a reply, future commands submitted by the graphics application should not be executed until the reply has been generated. Thus, most conventional X servers are configured to wait for the generation of a reply when processing a command that requires a reply.

Thus, the X server 162 may be configured such that the processing of a command requiring a reply is not complete until at least one or more of the slave pipelines 56–59 generates a reply. Such a reply may be communicated to the X server 162, which then communicates the reply to the application 17. After communicating the reply to the application 17, the X server 162 may begin processing the next command received by the master pipeline 55. However, the processing of a command in this way may cause some of the commands received by the master pipeline 55 to be significantly delayed. In this regard, commands received by the X server 162 may be delayed while the X server 162 is waiting for a reply.

Introducing a delay to the commands received by the master pipeline 55 can be particularly problematic for input commands received from the user of the system 50. In this regard, significant delaying of such commands may be confusing to the user. For example, a user may submit an input via a keyboard, but due to the delay caused by the master pipeline 55 processing a time consuming 3D graphics command, the system 50 may not respond to the input command for a significant amount of time. During such time, the user may be confused as to whether or not the system 50 has detected the input. As a result, the user may attempt to resubmit the input even though such resubmission may not be necessary.

In another example, the user may move a graphical pointer by manipulating a mouse. However, due to the delay caused by the master pipeline 55 processing a time consuming 3D graphics command, the input commands generated in response to the movement of the mouse may be significantly delayed. As a result, the movement of the graphical pointer may be delayed causing the graphical pointer to appear "frozen" for a period of time. The freezing of the graphical pointer can be very frustrating for the user and can even result in the user selecting an unintended option or object.

To help reduce the amount of delay experienced by input commands received from the user of the system 50, the X server 162 may be multi-threaded. In this regard, the X server dispatch layer 173, the DIX layer 175, and the DDX layer 179 may comprise one thread, and the GLX layer 177 may comprise another thread. Such an embodiment is illustrated in FIG. 6 where the GLX layer 177 is shown as a separate process, referred to as "3D process 252," relative to the X server dispatch layer 173, the DIX layer 175, and the DDX layer 179, which are collectively referred to as "2D process 254." In this embodiment, one thread of the X server 162 is responsible for implementing 3D process 252, and another thread of the X server 162 is responsible for implementing 2D process 254.

Figure 6:
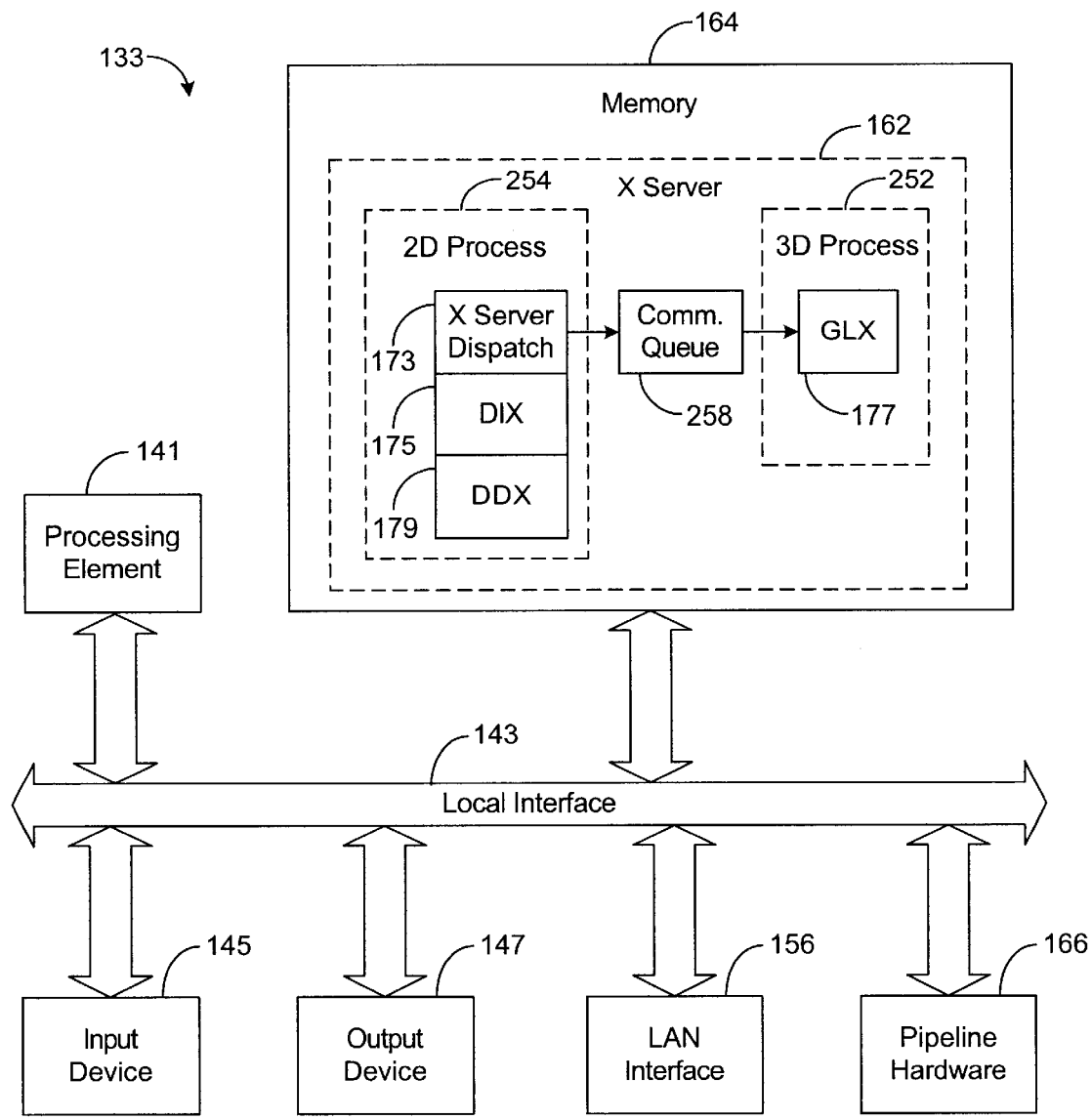
FIG. 6 is a block diagram illustrating utilizing multiple processes to process graphics commands received from the graphics application depicted in FIG. 3 according to an embodiment of the present invention.

In the embodiment shown by FIG. 6, the X server dispatch layer 173 of the 2D process 254 preferably routes each 2D command, including 2D input commands, to DIX layer 175 and DDX layer 179, which render graphical data associated with such commands to the frame buffer 65 similar to the techniques described above. In addition, the X server dispatch layer 173 of the 2D process 254 stores each 3D graphics command into a command queue 258. After a 3D graphics command is stored into the command queue 258, processing of the 3D graphics command by the 2D process 254 ends, and the 2D process 254 may begin processing the next command received by the X server 162.

The GLX layer 177 of the 3D process 252 is configured to process each of the 3D graphics commands stored in the command queue 258 similar to the techniques for processing 3D graphics commands described above. In this regard, the GLX layer 177 retrieves a 3D graphics command from the command queue 258 and passes the 3D graphics command to the slave pipelines 56–59. One or more of the slave pipelines 56–59 then execute the 3D graphics command. If the 3D graphics command requires a reply, the GLX layer 177 is preferably designed to wait for the reply from the slave pipelines 56–59 before processing the next command in the command queue 258. Once the GLX layer 177 has completely processed the current 3D graphics command, the GLX layer 177 preferably retrieves and processes the next 3D graphics command from the command queue 258.

In the aforedescribed embodiment, any delays experienced by the GLX layer 177 in processing the 3D graphics commands do not significantly delay the input commands received from the user of the system 50. In particular, any input command received by the X server 162 while processing a time consuming 3D graphics command is not significantly delayed. Moreover, the input command may be executed by the 2D process 254 while the 3D process 252 is processing the time consuming 3D graphics command. As a result, the performance of the system 50, as perceived by the user, is generally improved.

Note that utilizing multiple processes 252 and 254 to execute the commands received by the X server 162 introduces various potential data errors. For example, in separately executing 2D and 3D commands, both the 2D process 254 and the 3D process 252 may attempt to communicate replies to the graphics application 17 at the same time. If this occurs, one of the replies may interfere with or overwrite the other reply causing a data error. Thus, in the preferred embodiment, steps are taken to ensure that both the 3D process 252 and the 2D process 254 do not attempt to communicate a reply to the graphics application 17 at the same time. Note that there are a variety of techniques that may be employed to prevent the processes 252 and 254 from simultaneously communicating replies to the graphics application 17.

As an example, when the 3D process 252 determines that a reply should be communicated to the graphics application 17, the process 252 may assert a signal, referred to hereafter as a "lock signal," that is communicated to the 2D process 254. When the lock signal is asserted, the 2D process 254 is preferably configured to refrain from communicating replies to the graphics application 17.

After asserting the lock signal, the 3D process 252 then communicates its reply to the graphics application 17. After communicating this reply, the 3D process 252 deasserts the lock signal. Once the lock signal is deasserted, the 2D process 252 may again communicate replies to the graphics application 17.

By implementing the foregoing, reply overwrites may be prevented. In this regard, when the 3D process 252 is communicating a reply, the 3D process prevents the 2D process 254 from overwriting the reply by asserting the lock signal. Furthermore, when the lock signal is deasserted, the 2D process 254 may communicate its replies. However, while the lock signal is deasserted, the 3D process 252 is not communicating replies to the graphics application 17, and a reply overwrite, therefore, does not occur.

Figure 7:
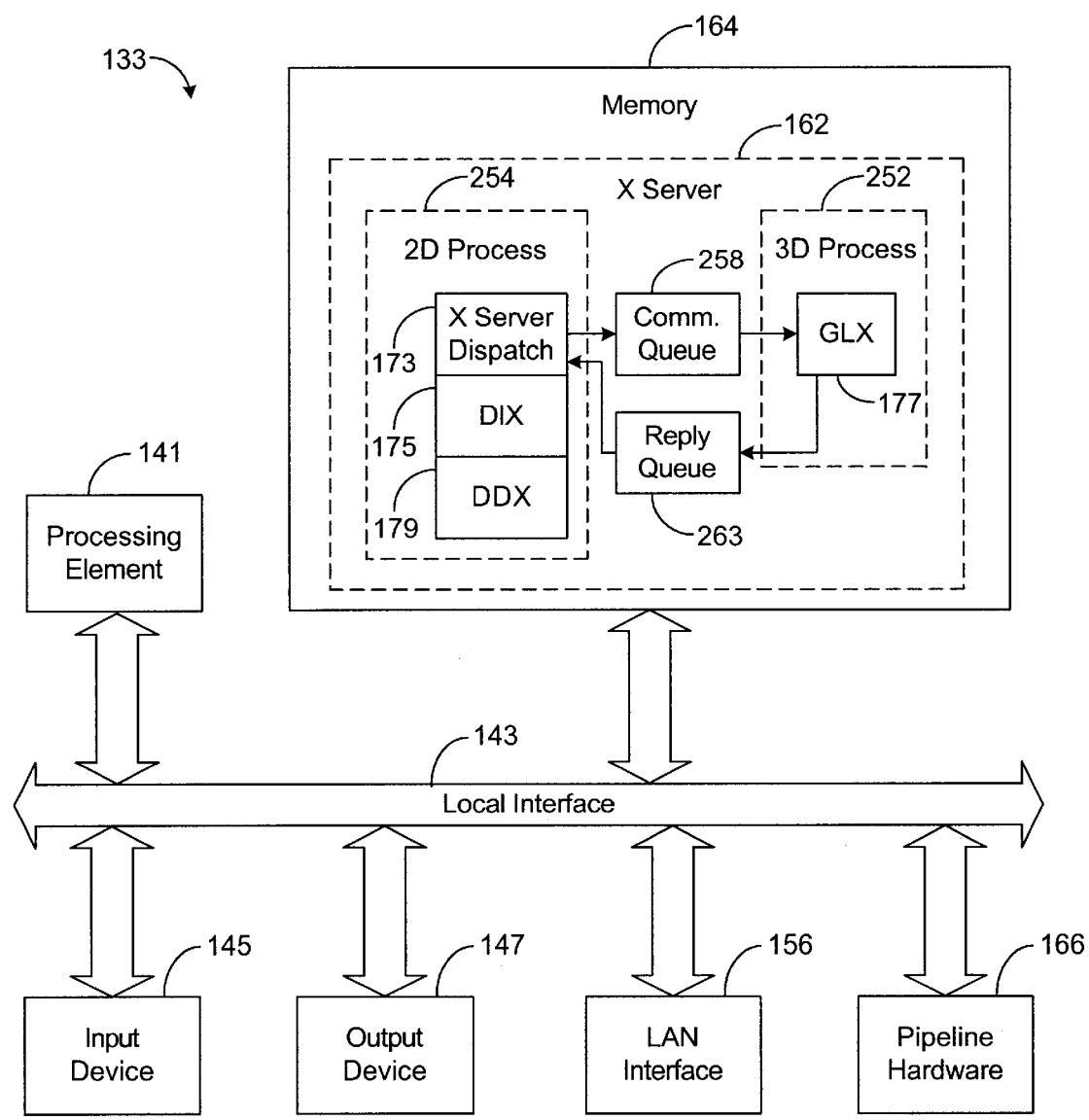
FIG. 7 is a block diagram illustrating when one of the processes depicted in FIG. 6 is configured to queue replies in order to prevent reply overwrites.

In another embodiment, which is depicted by FIG. 7, the 3D process 252 can be configured to queue replies to prevent reply overwrites. In this regard, when the 3D process 252 determines that a reply should be communicated to the graphics application 17, the process 252 preferably stores data indicative of the reply in a reply queue 263. The 2D process 254 periodically checks the reply queue 263 to determine whether any replies derived from the processing of 3D graphics commands are to be communicated to the graphics application 17. When such a reply is indicated by the reply queue 263, the 2D process 254 communicates the reply to the graphics application 17. Moreover, the transmission of replies derived from both 2D commands and 3D commands are handled by the 2D process 254. By ensuring that such replies are serially transmitted, the 2D process 254 can ensure that none of the replies interfere with or overwrite any of the other replies.

Figure 8:
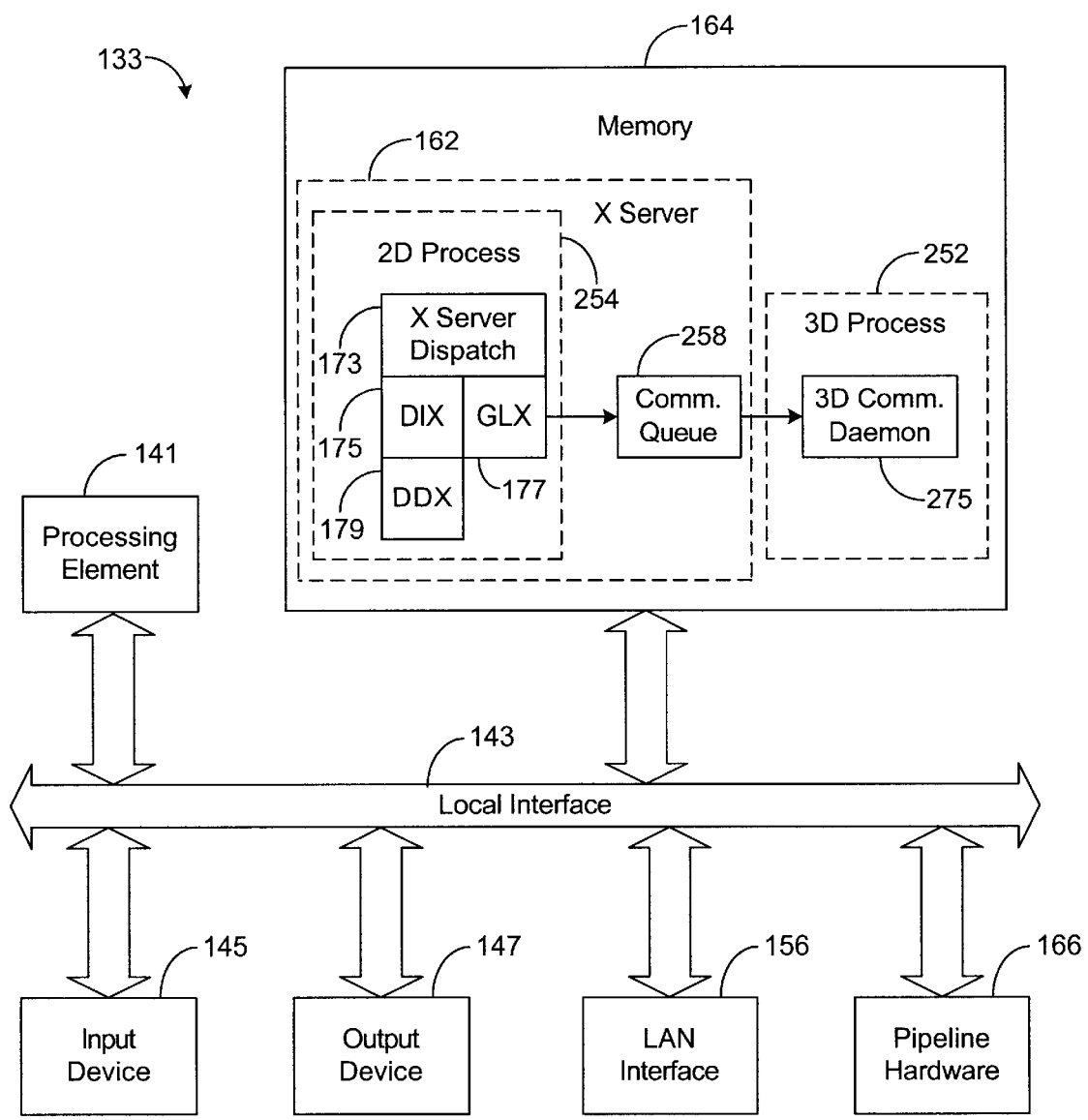
FIG. 8 is a block diagram illustrating when a two-dimensional (2D) process is implemented via an X server and when a three-dimensional (3D) process is external to the X server.

In another exemplary embodiment, which is shown by FIG. 8, the X server 162 may be single-threaded. In such an embodiment, the X server 162, including the GLX layer 177, generally performs the functionality described above for the 2D process 254, and a component, referred to as "3D command daemon 275," separate from the X server 162, generally performs the functionality described above for the 3D process 252. In this regard, the X server dispatch layer 173 preferably routes each 2D command, including 2D input commands, to DIX layer 175 and DDX layer 179, which render graphical data associated with such commands to the frame buffer 65 similar to the techniques described above. In addition, the X server dispatch layer 173 of the 2D process 254 routes each 3D command to the GLX layer 177. The GLX layer 177 is preferably configured to store each such 3D graphics command into the command queue 258. After the 2D process 254 stores a 3D graphics command into the command queue 258, the processing of the 3D graphics command by the process 254 ends. Thus, the 2D process 254 may begin processing the next command received by the X server 162.

The 3D command daemon 275 of the 3D process 152 is configured to process each of the 3D graphics commands stored in the command queue 258 similar to the techniques described above for the GLX layer 177 in previous embodiments. In this regard, the 3D command daemon 275 retrieves a 3D graphics command from the command queue 258 and passes the 3D graphics command to the slave pipelines 56–59, and one or more of the slave pipelines 56–59 execute the 3D graphics command. If the 3D graphics command requires a reply, the 3D command daemon 275 is preferably designed to wait for the reply from the slave pipelines 56–59 before processing the next command in the command queue 258. Once the 3D command daemon 275 has completely processed the current 3D graphics command, the 3D command daemon 275 preferably retrieves and processes the next 3D graphics command from the command queue 258.

In the aforedescribed embodiment, any delays experienced by the 3D command daemon 275 in processing the 3D graphics commands do not significantly delay the input commands received from the user of the system 50. In particular, any input command received by the X server 162 while processing a time consuming 3D graphics command is not significantly delayed. Moreover, the input command may be executed by the 2D process 254 while the 3D process 252 is processing the time consuming 3D graphics command. As a result, the performance of the system 50, as perceived by the user, is generally improved.

Note that, the 3D process 252 and the 2D process 254 of FIG. 8 may employ the same techniques described above for preventing reply overwrites. In this regard, the 3D process 254 of FIG. 8 may prevent the 2D process 252 from communicating replies to the application 17 at the same time that the 3D process 252 is communicating a reply to the application 17. Furthermore, in an alternative embodiment, the 3D process 252 of FIG. 8 may queue its replies letting the 2D process 254 handle the communication of such replies to the 2D process 254. Note that other techniques for preventing reply overwrites may be employed by the process 252 and 254 of FIG. 8.

Furthermore, the processes 252 and 254 are configured to perform similar functionality in each of the embodiments described above. The primary difference between the embodiment shown by FIG. 8 and the embodiments shown by FIGS. 6 and 7 is that the GLX layer 177 of the X server 162 in FIG. 8 is not responsible for providing 3D graphics commands to the salve pipelines 56–59. Instead, it is responsible for providing the 3D graphics commands to the command queue 258. Moreover, the embodiment shown by FIG. 8 can be implemented utilizing a single-threaded X server 162, which can be implemented by slightly modifying a GLX layer of a conventional single-threaded X server (e.g., modifying the GLX layer such that it stores 3D commands to the command queue). Slightly modifying a conventional X server in this way can be much simpler than converting a conventional single-threaded X server into a multi-threaded X server, as may be done to implement the embodiment shown by FIGS. 6 and 7. Thus, the embodiment shown by FIG. 8 may facilitate implementation of the system 50.

OPERATION

The preferred use and operation of the processes 252 and 254, and associated methodology, are described hereafter.

In a first embodiment, assume that the processes 252 and 254 are configured to prevent reply overwrites by having the 2D process 254 refrain from communicating replies when a lock signal from by the 3D process 252 is asserted. In this embodiment, the 2D process 254 determines, in block 311 of FIG. 9, whether the master pipeline 55 has received a new command to be processed. Such a command may be a graphics command from the application 17 or may be an input command submitted by a user of the system 50. In block 314, the process 254 determines whether or not the command is a 3D graphics command. If the command is a 3D graphics command, the process 254 queues the command into the command queue 258, as shown by block 317. Upon queuing the command, the process 254 returns to block 311 and begins to process the next command received by the master pipeline 55.

However, if the process 254 determines, in block 314, that the command is not a 3D graphics command, the process 254 executes the command in block 321 instead of queuing the command as described above. The process 254 also determines, in block 325, whether or not a reply is to be communicated to the application 17 in response to the command. If not, the process 254 returns to block 311 and begins to process the next command received by the master pipeline 55.

If a reply is to be communicated to the application 17, the process 254, in block 328, determines when it is ready to transmit such a reply. Once the process 254 is ready to transmit the reply, the process 254 determines, in block 333, whether it is receiving an asserted lock signal from the 3D process 252. If so, the 3D process 252 is communicating another reply to the application 17, and the process 254, therefore, refrains from communicating its reply. Once the process 254 detects that the lock signal is deasserted, the process 254 communicates its reply to the application 17 in block 335. At this point, the process 254 returns to block 311 and begins to process the next command received by the master pipeline 55.

Figure 9:
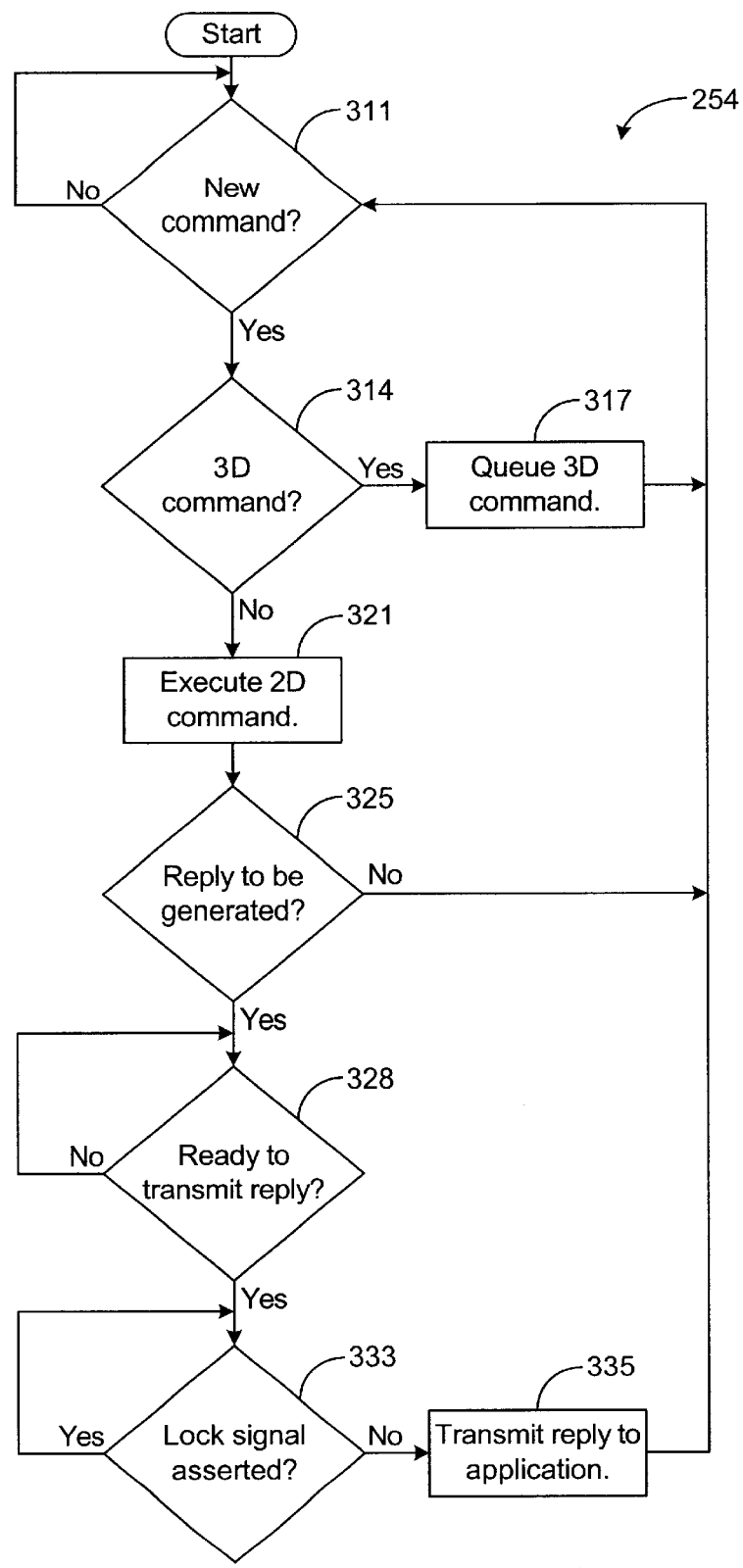
FIG. 9 is a flow chart illustrating an exemplary architecture and functionality of a 2D process such as is depicted in FIG. 6.
Figure 10:
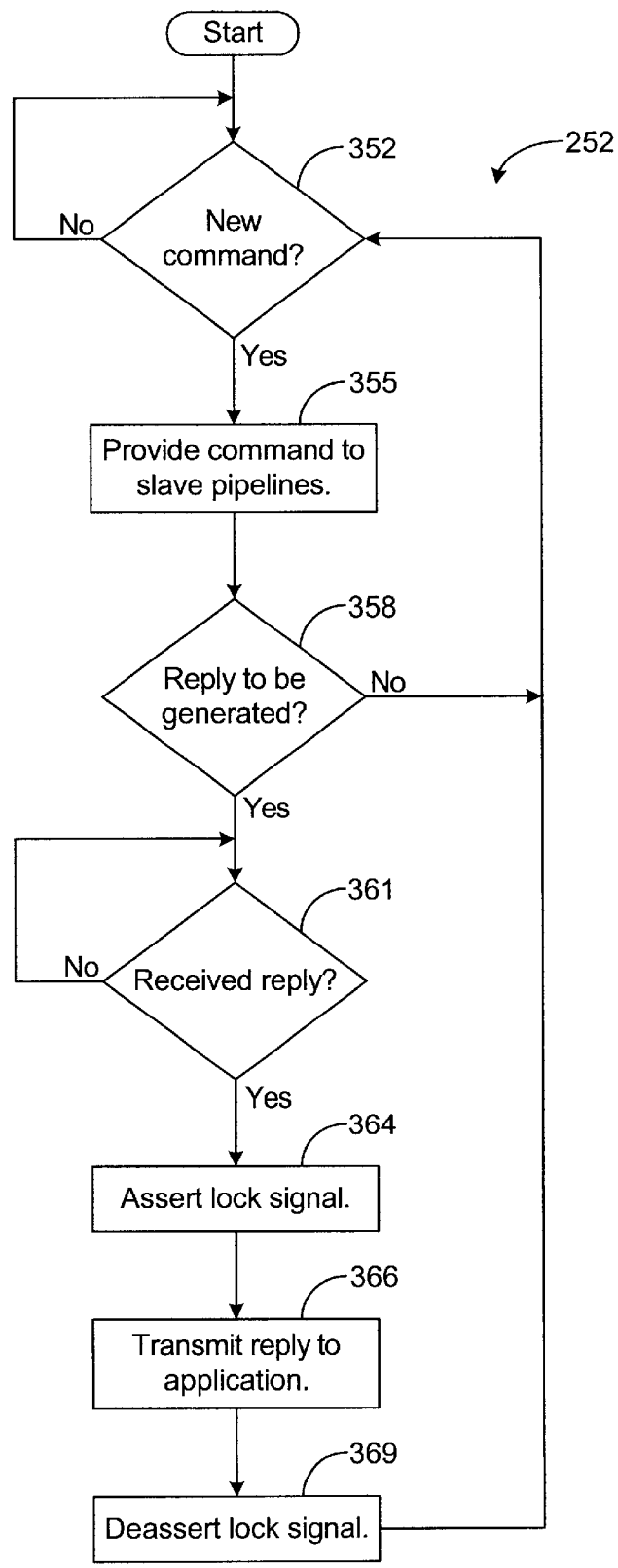
FIG. 10 is a flow chart illustrating an exemplary architecture and functionality of a 3D process such as is depicted in FIG. 6.

While the 2D process 254 is performing the blocks shown in FIG. 9, the 3D process 252 is performing the blocks shown by FIG. 10. In this regard, the 3D process 252 determines, in block 352, whether there are any commands queued in the command queue 258. Any such queued command is preferably a 3D graphics command to be executed by the slave pipelines 56–59 since the 2D process 254 is preferably designed to execute each 2D command. If there is a command in the queue 258, the process 252 retrieves the next command on a first-in, first-out (FIFO) basis and communicates the retrieved command to the slave pipelines 56–59 in block 355.

The process 252 also determines, in block 358, whether or not a reply should be communicated to the application 17 in response to the command. If not, the process 252 returns to block 352. However, if a reply is to be communicated in response to the command, the process 252 waits for the reply from one or more of the slave pipelines 56–59, as shown by block 361. Once the process 252 has received the reply from the one or more pipelines 56–59, the process 252 is ready to communicate the reply to the graphics application 17. However, before communicating the reply, the process 252 first asserts the lock signal being communicated to the 2D process 254, as shown by block 364. The process 252 then communicates the reply to the application 17 in block 366. Note that assertion of the lock signal in block 364 prevents the 2D process 254 from communicating a reply to the graphics application 17 at the same time that the process 252 is communicating a reply in block 366.

After completing the transmission of the reply to the application 17, the process 252 deasserts the lock signal in block 369, thereby allowing the 2D process 254 to again communicate replies to the application 17. At this point, the process 252 returns to block 352 and begins to process the next command from the command queue 258.

Thus, the 2D process 254 may process 2D commands while the 3D process 252 is simultaneously processing 3D commands. Moreover, delays encountered by the 3D process 252 preferably do not delay the processing of the 2D commands by the 2D process 254. As a result, delays to the input commands submitted by the user of the system 50 are likely to be reduced.

Figure 11:
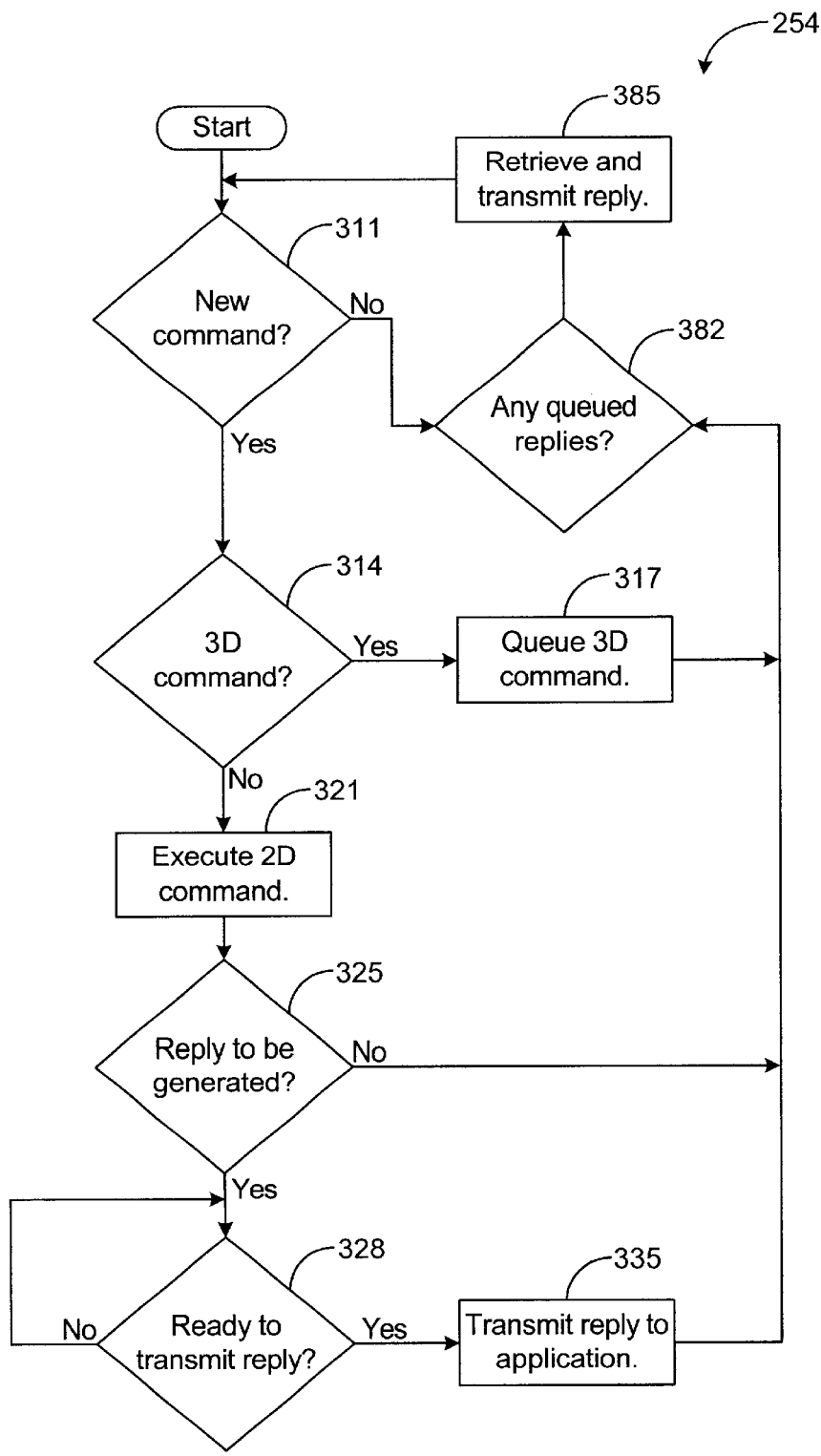
FIG. 11 is a flow chart illustrating an exemplary architecture and functionality of a 2D process such as is depicted in FIG. 7.

FIG. 11 illustrates an operation of the 2D process 254 in another embodiment where reply overwrites are prevented by queuing replies from the 3D process 254. As can be seen by comparing FIG. 9 with FIG. 11, the operation of the 2D process 254 in present embodiment is similar to its operation in the previous embodiment. However, once the process 254 has completed processing a command in the present embodiment, the process 254 checks the reply queue 263, as shown by block 382. Any reply in the reply queue 263 is from the 3D process 252, which queued the reply instead of communicating the reply to the application 17. If there are any such replies in the reply queue 263, the 2D process 254 communicates the replies to the application 17 in block 385.

Then, the process 254 begins to process the next command received by the master pipeline 55.

Figure 12:
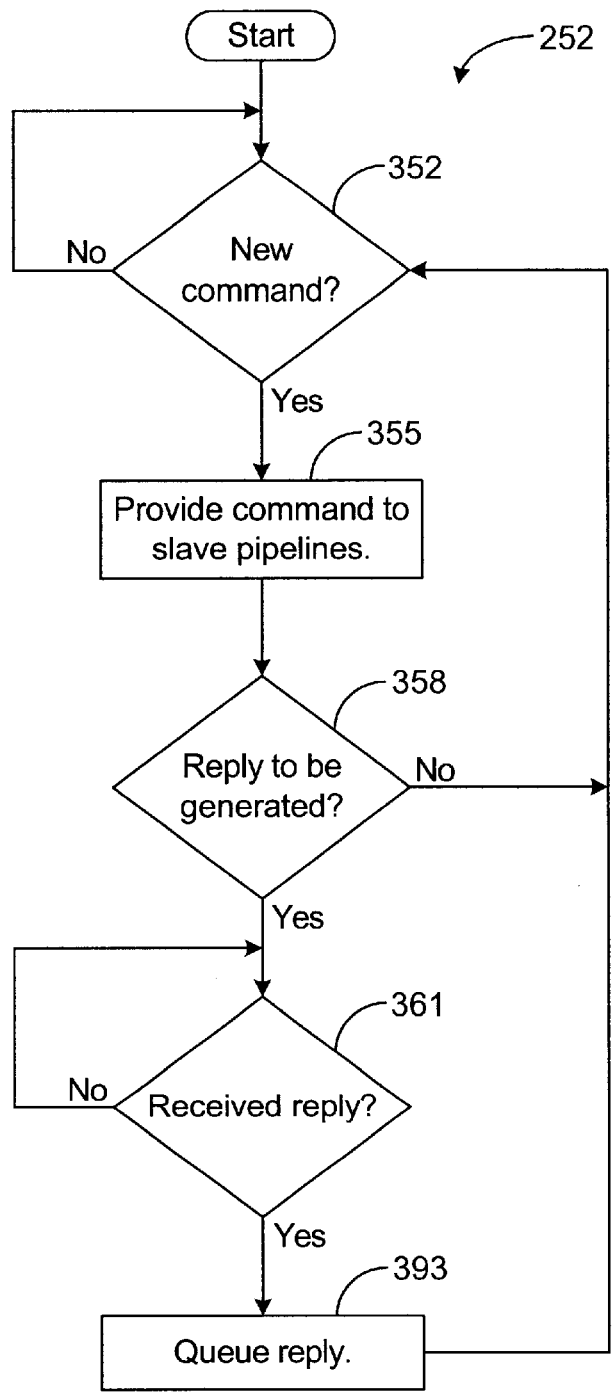
FIG. 12 is a flow chart illustrating an exemplary architecture and functionality of a 3D process such as is depicted in FIG. 7.

Moreover, FIG. 12 illustrates an operation of the 3D process 252 in the present embodiment. As can be seen by comparing FIG. 10 to FIG. 12, the operation of the process 252 in the present embodiment is similar to its operation in the previous embodiment. However, instead of communicating a reply to the application 17, as is done in block 366 of FIG. 10, the process 252, in the present embodiment, stores the reply to the reply queue 263 in block 393. Furthermore, since the 2D process 254 handles the communication of each reply to the application 17 in the present embodiment, it is not necessary for the process 252 depicted by FIG. 12 to communicate a lock signal to the process 254.

Now, therefore, the following is claimed:

1. A graphical rendering system, comprising:
   a plurality of graphics pipelines configured to render graphical data in parallel;
   a first process configured to queue three-dimensional (3D) graphics commands received from a graphics application and to execute input commands received from an input device; and
   a second process configured to interface the queued 3D graphics commands with the plurality of pipelines, the second process configured to communicate, to the graphics application, a reply received from one of the graphics pipelines and associated with one of the 3D graphics commands, the second process further configured to disable the first process from transmitting to the graphics application while the second process is communicating the reply to the graphics application.

2. The system of claim 1, wherein the first process is implemented via a single-threaded server.

3. The system of claim 2, wherein the single-threaded server is configured to process the received commands in accordance with X Protocol.

4. The system of claim 1, wherein the first process and the second process are implemented via a multi-threaded server, one thread of the multi-threaded server for running the first process, another thread of the multi-thread server for running the second process.

5. The system of claim 4, wherein the multi-threaded server is configured to process the received commands in accordance with X Protocol.

6. A graphical rendering system, comprising:
   a plurality of graphics pipelines configured to render graphical data;
   a first process configured to buffer three dimensional (3D) graphics commands received from a graphics application and to execute input commands received from an input device; and
   a second process configured to interface the buffered graphics commands with the plurality of pipelines, the second process configured to communicate, to the graphics application, a reply received from one of the graphics pipelines and associated with one of the 3D graphics commands, the second process further configured to disable the first process from transmitting to the graphics application while the second process is communicating the reply to the graphics application.

7. The system of claim 6, wherein the first process and the second process are implemented via a multi-threaded server, one thread of the multi-threaded server for running the first process, another thread of the multi-threaded server for running the second process.

8. The system of claim 6, wherein a network interfaces the second process with each of the plurality of pipelines.

9. The system of claim 6, wherein the first process is configured to make a determination as to whether at least one of the commands received by the first process is a graphics command, wherein the first process is configured to buffer, without executing, the at least one command based on the determination if the at least one command is an input command from the input device.

10. The system of claim 9, wherein the first process is configured to execute the at least one command based on the determination if the at least one command is a graphics command.

11. A graphical rendering method, comprising:
    rendering graphical data in parallel via a plurality of graphics pipelines;
    receiving user input commands and three-dimensional (3D) graphics commands;
    queuing the 3D graphics commands, via a first process;
    interfacing the queued commands, via a second process, with the plurality of graphics pipelines;
    executing the user input commands, via the first process;
    generating the 3D graphics commands via a graphics application;
    receiving, via the second process, a reply from one of the graphics pipelines, the reply associated with one of the identified graphics commands; and
    disabling, in response to the receiving a reply, the first process from communicating replies to the graphics application.

12. The method of claim 11, further comprising:
    implementing the first process via a first thread of a multi-threaded server; and
    implementing the second process via a second thread of the multi-threaded server.

13. The method of claim 12, wherein the multi-threaded server is an X server.

14. The method of claim 11, further comprising implementing the first process via a single-threaded server.

15. The method of claim 14, wherein the single-threaded server is an X server.

16. The method of claim 11, wherein the interfacing comprises transmitting the queued commands through a network to the plurality of graphics pipelines.

17. The method of claim 11, further comprising determining whether to queue at least one of the received commands in the command queue based on whether the at least one received command is a graphics command.

18. The method of claim 17, wherein the queuing comprises queuing the at least one received command in the command queue if the at least one received command is a graphics command, and wherein the interfacing comprises interfacing the at least one received command with the plurality of graphics pipelines if the at least one received command is an input command.

19. A graphical rendering method, comprising:
    receiving a plurality of user input commands and a plurality of three-dimensional (3D) graphics commands;
    buffering the received 3D graphics commands and executing the received user input commands via a first process;
    interfacing, via a second process, the buffered 3D graphics commands with each of a plurality of graphics pipelines;
    generating a reply, via one of the pipelines, based on execution of one of the 3D graphics commands;

communicating, via the second process, the reply to a graphics application; and disabling, in response to the reply, the first process from communicating replies to the graphics application.

20. The method of claim 19, further comprising implementing the first process via a first thread of a multi-threaded server.

21. The method of claim 19, further comprising implementing the second process via a second thread of a multi-threaded server.

22. The method of claim 19, wherein the interfacing comprises transmitting the buffered 3D graphics commands through a network to each of the plurality of graphics pipelines.

23. The method of claim 19, further comprising determining whether to queue at least one of the received commands based on whether the at least one received command is a graphics command.

24. The method of claim 23, wherein the buffering comprises buffering the at least one received command if the at least one received command is a graphics command, and wherein the interfacing comprises interfacing the at least one received command with the plurality of graphics pipelines if the at least one received command is an input command.

25. A graphical rendering system, comprising:

a plurality of graphics pipelines configured to render graphical data in parallel;

a first process configured to queue three-dimensional (3D) graphics commands received from a graphics application and to execute input commands received from an input device; and a second process configured to interface the queued 3D graphics commands with the plurality of pipelines, the second process configured to store, in a queue, a reply received from one of the graphics pipelines and associated with one of the commands, wherein the first process is configured to retrieve the reply from the queue and communicate the reply to the graphics application.

26. A graphical rendering system, comprising:

a plurality of graphics pipelines configured to render graphical data;

a first process configured to buffer graphics commands received from a graphics application and to execute input commands received from an input device; and a second process configured to interface the buffered graphics commands with the plurality of pipelines, the second process configured to store, in a queue, a reply received from one of the graphics pipelines and associated with one of the commands, wherein the first process is configured to retrieve the reply from the queue and communicate the reply to the graphics application.

27. A graphical rendering method, comprising:

rendering graphical data in parallel via a plurality of graphics pipelines;

receiving user input commands and three-dimensional (3D) graphics commands;

queuing the 3D graphics commands, via a first process;

interfacing the queued commands, via a second process, with the plurality of graphics pipelines;

executing the user input commands, via the first process;

generating the 3D graphics commands via a graphics application;

receiving, via the second process, a reply from one of the graphics pipelines, the reply associated with one of the identified graphics commands;

storing the reply in a queue;

retrieving, via the first process, the reply from the queue; and communicating the retrieved reply to the graphics application.

28. A graphical rendering method, comprising:

receiving a plurality of user input commands and a plurality of three-dimensional (3D) graphics commands;

buffering the received 3D graphics commands and executing the received user input commands via a first process;

interfacing, via a second process, the buffered 3D graphics commands with each of a plurality of graphics pipelines;

generating a reply, via one of the pipelines, based on execution of one of the 3D graphics commands;

storing, via the second process, the reply into a queue;

retrieving, via the first process, the reply from the queue; and communicating the retrieved reply to a graphics application.

* * * * *